United States Patent
Umeki et al.

(10) Patent No.: US 10,647,184 B2
(45) Date of Patent: May 12, 2020

(54) SUNROOF APPARATUS

(71) Applicant: AISIN SEIKI KABUSHIKI KAISHA, Kariya-shi, Aichi-ken (JP)

(72) Inventors: Takayuki Umeki, Chiryu (JP); Satoru Fujisawa, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/981,399

(22) Filed: May 16, 2018

(65) Prior Publication Data
US 2018/0334017 A1 Nov. 22, 2018

(30) Foreign Application Priority Data
May 17, 2017 (JP) .................................. 2017-098020

(51) Int. Cl.
*B60J 7/043* (2006.01)
*B60J 7/057* (2006.01)
*B60J 7/02* (2006.01)

(52) U.S. Cl.
CPC ................. *B60J 7/043* (2013.01); *B60J 7/02* (2013.01); *B60J 7/0573* (2013.01)

(58) Field of Classification Search
CPC ....... B60J 7/02; B60J 7/05; B60J 7/053; B60J 7/057; B60J 7/043; B60J 7/0573

USPC .................................................. 296/221–223
See application file for complete search history.

(56) References Cited

U.S. PATENT DOCUMENTS 6,024,404 A * 2/2000 Stallfort ................... B60J 7/057
296/216.04
9,296,283 B2 * 3/2016 Nagashima .............. B60J 7/043

FOREIGN PATENT DOCUMENTS

DE 102006051488 * 5/2008 ................ B60J 7/04
JP 2002-52933 2/2002
JP 2010-132158 6/2010

\* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes: a movable panel adapted to open and close an opening in a roof of a vehicle; a guide rail provided at each of both-side edge portions of the opening; a cable which has a driving-side engagement portion and is driven to move in a forward and backward direction of the vehicle; a slide member having a driven-side engagement portion engaging with the driving-side engagement portion, linked to each of both-side edge portions, and provided to be movable in the forward and backward direction, along the guide rail, so that movement of the slide member causes the movable panel to open and close; and a holding portion protruding from the slide member in the width direction of the vehicle and positioned backward of the cable to abut against or close to the cable.

4 Claims, 7 Drawing Sheets

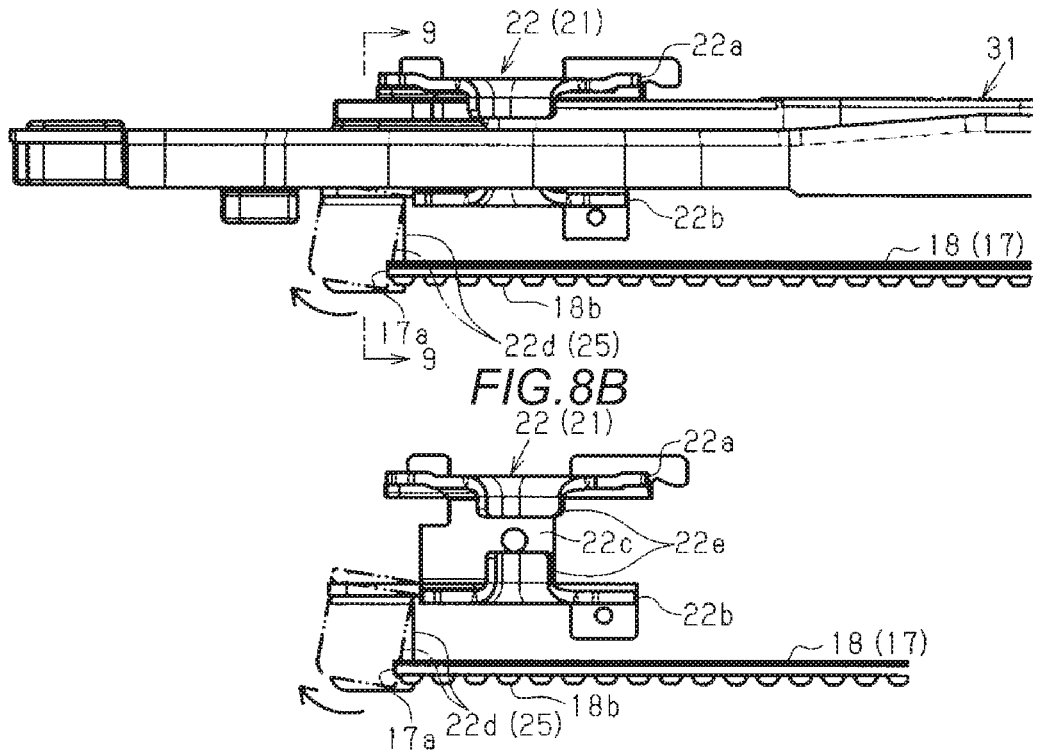
FIG.8A
FIG.8B
BACKWARD ← → FORWARD
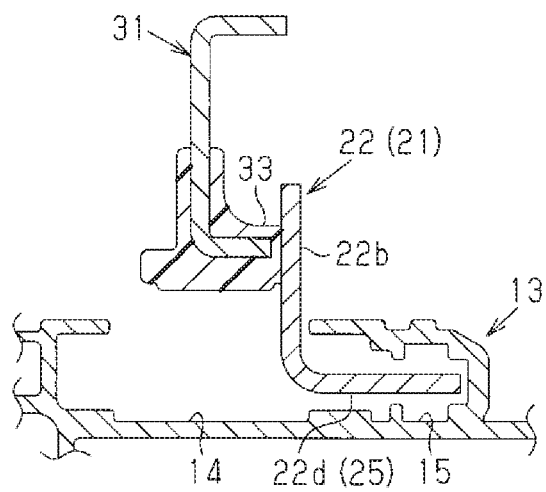
FIG.9
VEHICLE INSIDE ← WIDTH DIRECTION → VEHICLE OUTSIDE

SUNROOF APPARATUS

CROSS REFERENCE TO RELATED APPLICATIONS

This application is based on and claims priority under 35 U.S.C. § 119 to Japanese Patent Application 2017-098020, filed on May 17, 2017, the entire contents of which are incorporated herein by reference.

TECHNICAL FIELD

This disclosure relates to a sunroof apparatus.

BACKGROUND DISCUSSION

In the related art, a sunroof apparatus is disclosed in, for example, JP 2002-52933A (Reference 1). The sunroof apparatus includes a movable panel (slide panel) that is provided at an opening (opening portion) formed in a roof of a vehicle and guide rails that are respectively provided at both-side edge portions of the opening in a width direction of the vehicle. In addition, the sunroof apparatus includes a cable (cable member) that is driven so as to be moved in a forward and backward direction of the vehicle along the guide rails and a slide member that is linked to both-side edge portions of the movable panel respectively in the width direction of the vehicle and is provided to be movable in the forward and backward direction of the vehicle along the guide rails. A fastener is fastened to an end of the cable and a recess is formed in the slide member to receive the fastener. Therefore, when the cable moves in the forward and backward direction of the vehicle, the slide member engaging with the fastener in the recess integrally moves in the forward and backward direction of the vehicle. As the slide member moves in the forward and backward direction of the vehicle, the movable panel opens and closes.

However, in Reference 1, for example, when the movable panel, which is in an opened state, is jumped out forward the vehicle vigorously, due to a large input with respect to a vehicle such as an inertial force at the time of a front collision of the vehicle, the fastener or the recess may be plastically deformed and the fastener may be detached from the recess. In this case, the cable and the slide member move relative to each other, and the movable panel in the opened state closes. Therefore, it is required to stop the relative movement between the cable and the slide member promptly.

Thus, a need exists for a sunroof apparatus which is not susceptible to the drawback mentioned above.

SUMMARY

A sunroof apparatus according to an aspect of this disclosure includes: a movable panel which is adapted to open and close an opening formed in a roof of a vehicle; a guide rail which is provided at each of both-side edge portions of the opening in a width direction of the vehicle; a cable which has a driving-side engagement portion and is driven so as to move in a forward and backward direction of the vehicle, along the guide rail; a slide member which has a driven-side engagement portion engaging with the driving-side engagement portion, is linked to each of both-side edge portions of the movable panel in the width direction of the vehicle, and is provided so as to be movable in the forward and backward direction of the vehicle along the guide rail, so that movement of the slide member in the forward and backward direction of the vehicle causes the movable panel to open and close; and a holding portion which protrudes from the slide member in the width direction of the vehicle and is positioned backward of the cable in the vehicle to abut against or close to the cable.

BRIEF DESCRIPTION OF THE DRAWINGS

The foregoing and additional features and characteristics of this disclosure will become more apparent from the following detailed description considered with the reference to the accompanying drawings, wherein:

FIGS. 8A and 8B are plan views illustrating an operation of the sunroof apparatus of the embodiment;

FIG. 9 is a sectional view that is taken along line 9-9 of FIG. 8A;

DETAILED DESCRIPTION

First Embodiment

Hereinafter, a first embodiment of a sunroof apparatus will be described. In the following description, a forward and backward direction of a vehicle is referred to as a "forward and backward direction". In addition, an inside of the vehicle in a width direction toward a passenger compartment side is referred to as "vehicle inside" and an outside of the vehicle in the width direction outward the passenger compartment side is referred to as "vehicle outside".

Figure 1:
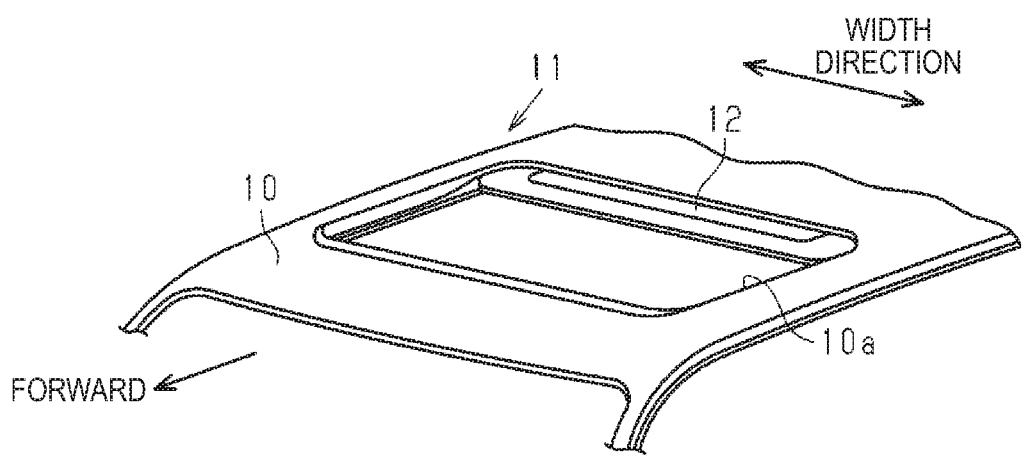
FIG. 1 is a perspective view illustrating a structure of a sunroof apparatus of a first embodiment.

As illustrated in FIG. 1, in a roof 10 of the vehicle such as an automobile, a substantially rectangular opening 10a is formed and a sunroof apparatus 11 is mounted. The sunroof apparatus 11 includes a substantially rectangular movable panel 12 which moves in the forward and backward direction to open and close the opening 10a and is made by, for example, glass plate.

The movable panel 12 is mounted so as to be capable of performing a tilt-up operation in which a rear portion moves upward by rotation in one direction around a front portion thereof, a tilt-down operation in which the rear portion moves downward by the rotation in the other direction around the front portion, and a slide operation in the forward and backward direction. In the opening and closing operation of the movable panel 12, a so-called inner sliding type, in which the slide operation is performed in a tilt-down state, is adopted.

Figure 2:
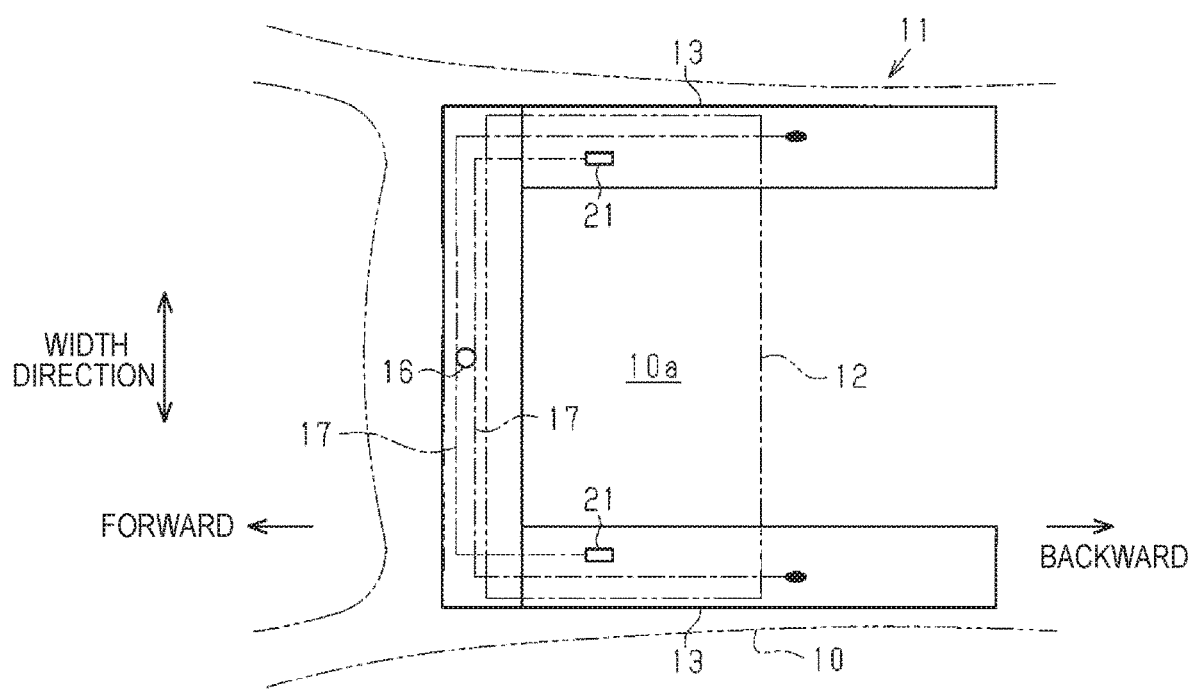
FIG. 2 is a plan view illustrating the structure of the sunroof apparatus of the embodiment.

As illustrated in FIG. 2, a pair of guide rails 13 is disposed on both-side edge portions of the opening 10a in a width direction of the vehicle. Each guide rail 13 is made of, for example, an aluminum alloy extruded material, has a constant cross section in a longitudinal direction, and extends in the forward and backward direction. A slide member 21 is guided and supported on each guide rail 13 to be movable in the forward and backward direction along thereof. Each of both-side edge portions of the movable panel 12 in the width direction of the vehicle is linked and supported on each slide member 21. The slide member 21 causes the movable panel 12 to perform the tilt-up operation, the tilt-down operation, or the slide operation according to movement in the forward and backward direction.

In addition, an electric motor 16 having, for example, an output gear is disposed on a front side of both guide rails 13 of the vehicle. The electric motor 16 is connected to each slide member 21 via each of belt 17 as a pair of substantially band-like cables, and moves both slide members 21 in the forward and backward direction simultaneously along the guide rails 13.

Next, a structure of the sunroof apparatus 11 related to the opening and closing operation of the movable panel 12 or the like will be described. Moreover, basically, the sunroof apparatus 11 has a structure related to the opening and closing operation of the movable panel 12 on both sides of the opening 10a in the width direction of the vehicle, and hereinafter, only the structure on one side in the width direction of the vehicle will be described.

Figure 5A:
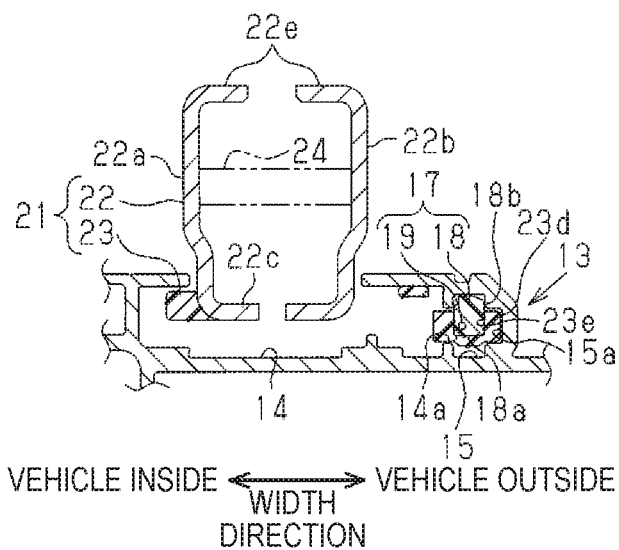
FIGS. 5A and 5B are sectional views which are taken along line 5A-5A and 5B-5B respectively.
Figure 5B:
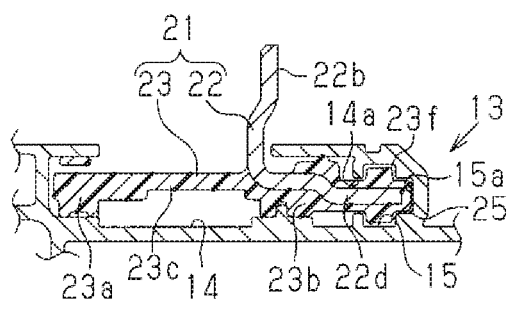
Figure 5C:
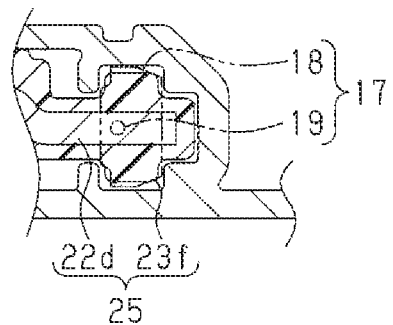
FIG. 5C is an enlarged view of FIG. 5B.

As illustrated in FIGS. 5A to 5C, each guide rail 13 is formed of a guide groove 14 having a substantially C-shaped cross section which opens upwardly and a belt guide groove 15 adjacent to the guide groove 14 on the vehicle outside. Moreover, the belt guide groove 15 has an inner wall surface 15a deviated to the vehicle outside at a center portion in a height direction of the vehicle. The belt guide groove 15 has a substantially T-shaped cross section in cooperation with a side wall of the guide groove 14 and communicates with the guide groove 14 at a communication port 14a formed on the side wall.

The belt 17 has a dimension slightly smaller than a width of the opening of the belt guide groove 15 in the height direction of the vehicle and is mounted on the belt guide groove 15 to be guided movably in the forward and backward direction along the guide rail 13. The belt 17 has a belt main body 18 made of, for example, a resin material and a core material 19 which is embedded so as to extend in an extending direction thereof at a center portion of the belt main body 18 in the height direction of the vehicle. The core material 19 is made of, for example, a metal wire material.

Figure 6:
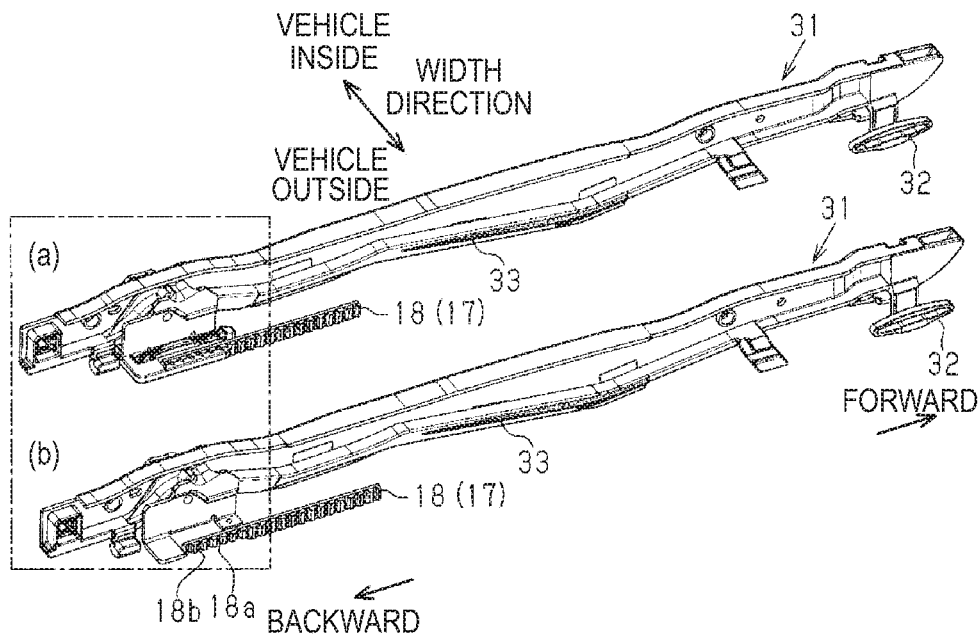
FIG. 6 is a perspective view illustrating the structure of the sunroof apparatus of the embodiment (part (a)) and a structure thereof in which a molded portion of a slide member is omitted (part (b))
Figure 7:
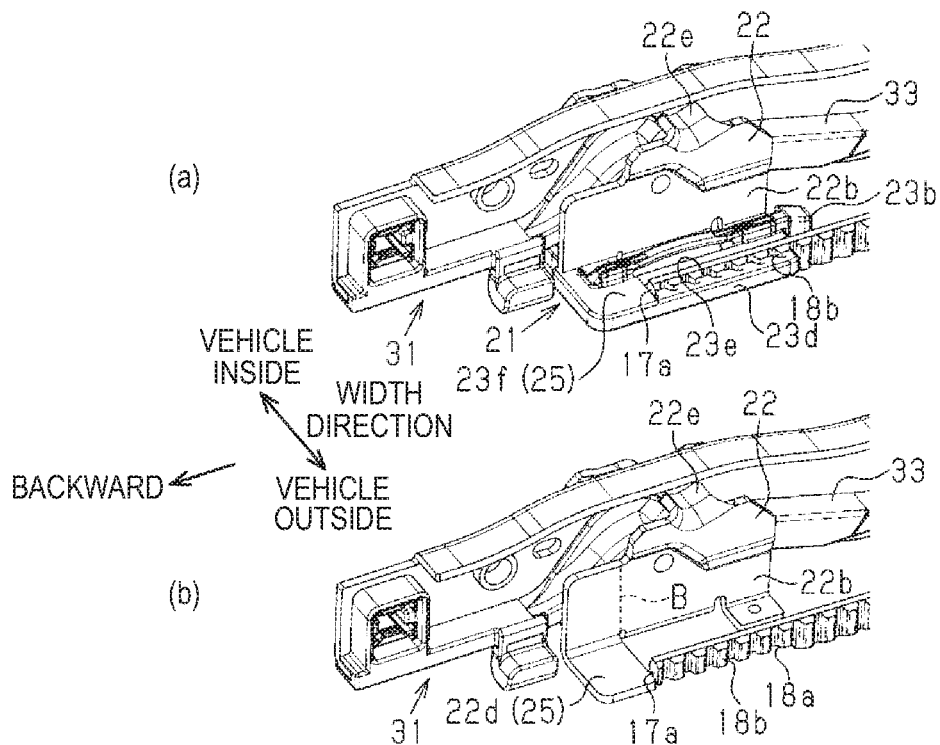
FIG. 7 is an enlarged view of FIG. 6.

As illustrated in FIGS. 6 and 7, the belt main body 18 has a rack gear shape in which teeth are engraved on the vehicle outside and a substantially rectangular cutout 18a is formed at a lower portion of a rear end portion. Moreover, the teeth of the belt main body 18 configure a driving-side engagement portion 18b in a range of the cutout 18a in the forward and backward direction.

Figure 4:
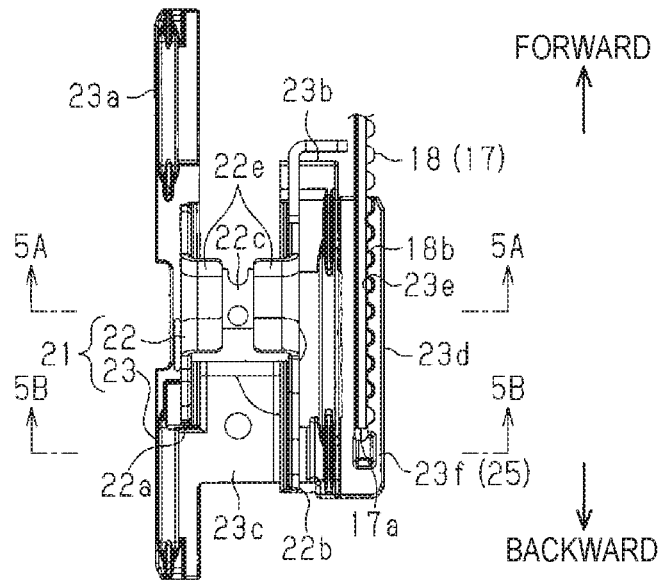
FIG. 4 is a plan view illustrating the structure of the sunroof apparatus of the embodiment.

On the other hand, as illustrated in FIGS. 4, 5A, and 5B, the slide member 21 has a main body portion 22 made of, for example, a metal plate and a molded portion 23 made of, for example, a resin material. The main body portion 22 has a first vertical wall 22a and a second vertical wall 22b as vertical walls arranged side by side in the width direction of the vehicle upward the guide groove 14, a bottom wall 22c which connects lower ends of the first and second vertical walls 22a and 22b in the width direction of the vehicle at an intermediate portion in the forward and backward direction, and a substantially rectangular holding plate 22d protruding from a lower end of a rear end portion of the second vertical wall 22b on the vehicle outside. The holding plate 22d enters the belt guide groove 15 from the communication port 14a. In addition, the main body portion 22 has a pair of guide flanges 22e which protrude from upper ends of the first and second vertical walls 22a and 22b in the intermediate portion of the first and second vertical walls 22a and 22b in the forward and backward direction to face each other in the width direction of the vehicle. Moreover, a substantially columnar guide pin 24, a center line of which extends in the width direction of the vehicle below both guide flanges 22e, is interposed between the first and second vertical walls 22a and 22b.

The molded portion 23 has a first shoe 23a which is connected to the lower end portion of the first vertical wall 22a and extends in the forward and backward direction, a second shoe 23b which is connected to the lower end portion of the second vertical wall 22b and extends in the forward and backward direction, and a connecting wall 23c that connects the first and second shoes 23a and 23b in the width direction of the vehicle. The first shoe 23a and the second shoe 23b are respectively mounted at the vehicle inside portion and the vehicle outside portion of the guide groove 14 in a pressed state, so that the molded portion 23 (slide member 21) is guided to be movable in the forward and backward direction along the guide rail 13.

In addition, the molded portion 23 has a connecting portion 23d which is adjacent to the second shoe 23b on the vehicle outside and is connected to the second shoe 23b. The connecting portion 23d extends in the forward and backward direction in a range of the cutout 18a of the belt main body 18. The connecting portion 23d has a U-shaped cross section entering the belt guide groove 15 from the communication port 14a and extending to a vicinity of the inner wall surface 15a while bypassing below the cutout 18a. The connecting portion 23d is mounted on the belt guide groove 15 in a state of being fitted to the cutout 18a so as to be movably guided in the forward and backward direction along the guide rail 13.

The vehicle outside portion of the connecting portion 23d positioned in the belt guide groove 15 has a rack gear shape in which teeth are engraved on the vehicle inside so as to face the driving-side engagement portion 18b. The teeth of the connecting portion 23d configure a driven-side engagement portion 23e meshing (engaging) with the driving-side engagement portion 18b. The driven-side engagement portion 23e meshes with the driving-side engagement portion 18b so that the slide member 21 moves in the forward and backward direction integrally with the belt 17.

Furthermore, the molded portion 23 has a holding molded portion 23f which is adjacent to the second shoe 23b on the vehicle outside backward the vehicle from the belt 17 and is connected to the second shoe 23b. The holding molded portion 23f is also connected to a back end of the connecting portion 23d. The holding molded portion 23f enters the belt guide groove 15 from the communication port 14a, extends to the vicinity of the inner wall surface 15a, and embeds the holding plate 22d in a state where the holding plate 22d is sandwiched in the height direction of the vehicle. The holding molded portion 23f configures a holding portion 25 in cooperation with the holding plate 22d. The holding portion 25 abuts against or closes to a rear end 17a of the belt 17 backward the vehicle of the belt 17 and is mounted on the belt guide groove 15, thereby being guided to be movable in the forward and backward direction along the guide rail 13.

Moreover, the holding portion 25 is set to be larger than the core material 19 in a dimension in the height direction of the vehicle, and is disposed so as to include the core material 19 in a range in the height direction of the vehicle. More precisely, the holding plate 22d is set to be larger than the core material 19 in a dimension in the height direction of the vehicle, and is disposed so as to include the core material 19 in a range in the height direction of the vehicle.

Figure 3:
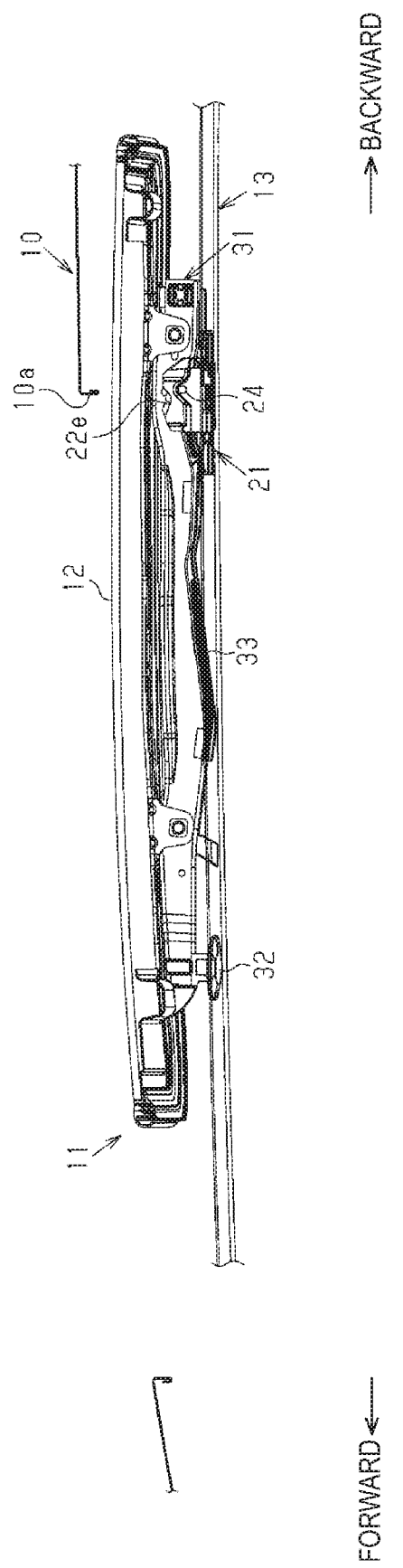
FIG. 3 is a side view illustrating the structure of the sunroof apparatus of the embodiment.

As illustrated in FIG. 3, each of the both-side edge portions of the movable panel 12 in the width direction (direction orthogonal to a paper surface in FIG. 3) of the vehicle is supported by a support member 31 extending in the forward and backward direction. The support member 31 is supported by the guide rail 13 so as to freely rotate in a direction in which a rear end portion rises and falls in a front support portion 32 provided at a front end portion, and to freely move in the forward and backward direction. In addition, in the support member 31, a pair of substantially stripe-shaped guide protrusion portions 33 protrudes in the width direction of the vehicle opposite to each other from a lower end backward of the vehicle from the front support portion 32. The support member 31 is supported by the slide member 21 in a state where each guide protrusion portion 33 is sandwiched between each guide flange 22e of the slide member 21 (main body portion 22) and the guide pin 24 in the height direction of the vehicle. In this case, as illustrated in FIG. 9, a distal end of the guide protrusion portion 33 on the vehicle outside abuts against or closes to the second vertical wall 22b of the main body portion 22.

Here, in a fully closed state of the movable panel 12, the guide protrusion portion 33 is basically inclined according to heading backward the vehicle and the slide member 21 (guide flange 22e and guide pin 24) is disposed at an intermediate portion of the guide protrusion portion 33 in the longitudinal direction. Therefore, in the fully closed state of the movable panel 12, when the slide member 21 moves forward the vehicle along the guide rail 13, the support member 31 is pushed up by the guide pin 24 at the guide protrusion portion 33 so as to rotate in a direction in which the rear end portion rises about the front support portion 32 and the movable panel 12 tilts up. Conversely, in the fully closed state of the movable panel 12, when the slide member 21 moves backward the vehicle along the guide rail 13, the support member 31 is pushed down by the guide flange 22e at the guide protrusion portion 33 so as to rotate in a direction in which the rear end portion is lowered about the front support portion 32 and the movable panel 12 tilts down.

When the guide flange 22e and the guide pin 24 reach a terminal end (rear end) of the guide protrusion portion 33 in accordance with the movement of the slide member 21 backward the vehicle along the guide rail 13, the tilt-down operation of the movable panel 12 is terminated. In this case, the guide flange 22e and the guide pin 24 are engaged with the guide protrusion portion 33, so that the movement of the slide member 21 with respect to the support member 31 is restricted. Therefore, when the slide member 21 further moves backward the vehicle along the guide rail 13, the support member 31 integrally moves backward the vehicle and the movable panel 12 is opened in the tilt-down state. Therefore, the movable panel 12 is fully opened and the opening 10a is opened.

Next, an operation of the embodiment will be described.

As illustrated in FIGS. 7, 8A, and 8B, the slide member 21 meshed with the driving-side engagement portion 18b in the driven-side engagement portion 23e is provided so that the holding plate 22d (the holding portion 25) abuts against or closes to the distal end (rear end 17a) of the belt 17 backward the vehicle of the belt 17. Therefore, for example, when the movable panel 12, which is in the opened state is jumped out forward the vehicle vigorously, due to a large input with respect to the vehicle such as an impact force (inertial force) at the time of a front collision of the vehicle, meshing between the driving-side engagement portion 18b and the driven-side engagement portion 23e is released, and thereby the belt 17 and the slide member 21 relatively move in the forward and backward direction. In this case, the holding plate 22d (holding portion 25) positioned backward the vehicle of the belt 17 presses the rear end 17a of the belt 17, so that the belt 17 buckles and deforms while buffering the impact force. Therefore, the relative movement between the belt 17 and the slide member 21 is quickly stopped.

Specifically, the holding plate 22d includes the core material 19 in a range in the height direction of the vehicle, so that the entire distal end (rear end) of the core material 19 is pressed. Therefore, even if stress concentrates on the center portion in the height direction of the vehicle of the belt 17 pressed against the holding plate 22d (holding portion 25), tearing of the belt 17 in the height direction of the vehicle is suppressed.

In addition, when the holding plate 22d (holding portion 25) presses the rear end 17a of the belt 17 in accordance with the relative movement between the belt 17 and the slide member 21, as illustrated in a broken line in part (b) of FIG. 7, the holding plate 22d deforms (plastically deforms) in a rotation direction in which the holding plate 22d is displaced backward the vehicle around a base point B of deformation extending in the height direction of the vehicle along the second vertical wall 22b at the position of the front end thereof, that is, in a rotation direction in which the rear end portion of the second vertical wall 22b is displaced to the vehicle inside to abut against the guide protrusion portion 33 of the support member 31. That is, as illustrated in FIG. 9, the second vertical wall 22b is capable of abutting against the guide protrusion portion 33 on the vehicle outside in the deformation direction of the holding plate 22d. As described above, when the holding plate 22d deforms together with the second vertical wall 22b, the second vertical wall 22b interferes with the guide protrusion portion 33, so that the deformation of the holding plate 22d is suppressed.

Next, effects of the embodiment will be described.

(1) In the embodiment, when the movable panel 12, which is in the opened state, is jumped out forward the vehicle vigorously, due to a large input with respect to the vehicle, engagement between the driving-side engagement portion 18b and the driven-side engagement portion 23e is released, and thereby the belt 17 and the slide member 21 relatively move in the forward and backward direction. In this case, the holding portion 25 positioned backward of the belt 17 in the vehicle presses the distal end (rear end 17a) of the belt 17, so that the belt 17 buckles and deforms while buffering the impact force. Therefore, the relative movement between the belt 17 and the slide member 21 can be quickly stopped. A closing operation of the movable panel 12 in the opened state can be quickly stopped.

(2) In the embodiment, the slide member 21 has the second vertical wall 22b capable of abutting against the support member 31 (guide protrusion portion 33) in the deformation direction of the holding portion 25 in accordance with pressing of the distal end (rear end 17a) of the belt 17. Therefore, when the holding portion 25 presses the distal end (the rear end 17a) of the belt 17 by the relative movement between the belt 17 and the slide member 21, so that the holding portion 25 deforms together with the second vertical wall 22b, the second vertical wall 22b abuts against the support member 31. Therefore, the deformation of the holding portion 25 can be suppressed. In addition, therefore, buckling deformation of the belt 17 pressed by the holding portion 25 can be further stabilized and buffering of the impact force by the belt 17 can be further stabilized.

(3) In the embodiment, the holding portion 25 (holding plate 22d) is set to be larger than the core material 19 in a dimension in the height direction of the vehicle, and is disposed so as to include the core material 19 in a range in the height direction of the vehicle. Therefore, when the distal end (rear end 17a) of the belt 17 is pressed in accordance with the relative movement between the belt 17 and the slide member 21, the entire distal end (rear end) of the core material 19 is pressed. Therefore, it is possible to suppress tearing of the belt 17 pressed by the holding portion 25, in the height direction of the vehicle, so that buckling deformation of the belt 17 can be further stabilized. Buffering of the impact force by the belt 17 can be further stabilized.

(4) In the embodiment, for example, when the belt 17 and the slide member 21 move relative to each other in the forward and backward direction due to a slight force such as catching of the movable panel 12 during the opening and closing operation, the holding portion 25 positioned backward the vehicle of the belt 17 abuts against the distal end (rear end 17a) of the belt 17. Therefore, the relative movement between the belt 17 and the slide member 21 can be quickly suppressed and a meshing state of the driving-side engagement portion 18b and the driven-side engagement portion 23e can be more firmly maintained.

A (5) In the embodiment, since the holding portion 25 has a very simple structure protruding from the slide member 21 to the vehicle outside, the number of components and the cost can be reduced.

(6) In order to improve rigidity of the holding portion, it is only necessary to increase the size of the holding portion, but the formability is impaired or the cost is increased accordingly. In the embodiment, the holding portion 25 has the holding plate 22d made of metal (at least a part thereof is made of metal), so that it is possible to further reduce the size while ensuring the required rigidity.

Second Embodiment

Hereinafter, a second embodiment of a sunroof apparatus will be described. Moreover, since the second embodiment has a configuration in which the slide member of the first embodiment is changed, detailed description of the same portion will be omitted.

Figure 10A:
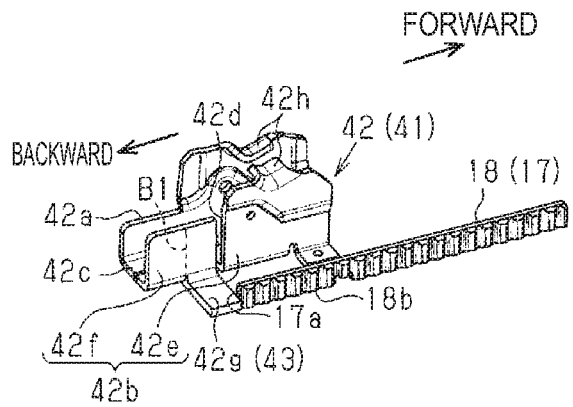
FIGS. 10A and 10B are perspective views illustrating structures of a sunroof apparatus of a second embodiment and the first embodiment.

As illustrated in FIG. 10A, a main body portion 42 of a slide member 41 of the embodiment is made of, for example, a metal plate and has a first vertical wall 42a and a second vertical wall 42b arranged side by side in the width direction of the vehicle conforming the first vertical wall 22a and the second vertical wall 22b, and a bottom wall 42c which connects lower ends of the first and second vertical walls 42a and 42b in the width direction of the vehicle. The second vertical wall 42b is divided into two in the front and rear by a slit 42d to form a front vertical wall 42e and a rear vertical wall 42f as the vertical walls. In addition, the main body portion 42 has a holding plate 42g conforming the holding plate 22d protruding from a lower end of a front end of the rear vertical wall 42f to the vehicle outside. Furthermore, the main body portion 42 has guide flanges 42h conforming the pair of guide flanges 22e protruding in the width direction of the vehicle facing each other from an upper end in an intermediate portion of the first vertical wall 42a and the front vertical wall 42e in the forward and backward direction.

Moreover, the slide member 41 has a molded portion (not illustrated) conforming the molded portion 23. Therefore, similar to the first embodiment, the slide member 41 is guided to be movable in the forward and backward direction along the guide rail 13 and meshes with the driving-side engagement portion 18b, so as to move in the forward and backward direction integrally with the belt 17. Particularly, the molded portion has a holding molded portion configuring a holding portion 43 conforming the holding portion 25 in cooperation with the holding plate 42g.

Next, an operation of the embodiment will be described.

For example, when the movable panel 12, which is in the opened state, is jumped out forward the vehicle vigorously, due to a large input with respect to the vehicle, such as an impact force (inertial force) at the time of a front collision of the vehicle, meshing with the driving-side engagement portion 18b and the movable panel 12 is released, and thereby the belt 17 and the slide member 41 relatively move in the forward and backward direction. In this case, the holding plate 42g (the holding portion 43) positioned backward the vehicle of the belt 17 presses the rear end 17a of the belt 17, so that the belt 17 buckles and deforms while buffering the impact force. Therefore, the relative movement between the belt 17 and the slide member 41 is quickly stopped.

Figure 11A:
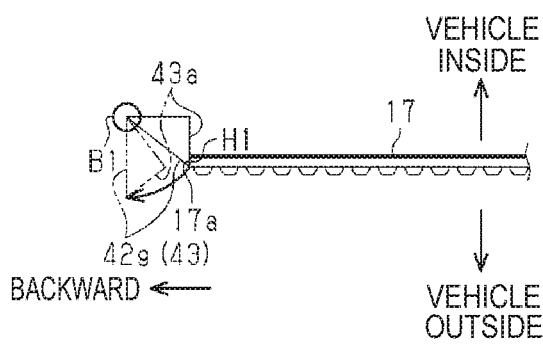
FIGS. 11A and 11B are plan views illustrating operations of the sunroof apparatus of the second embodiment and the first embodiment.

In addition, when the holding plate 42g (holding portion 43) presses the rear end 17a of the belt 17 in accordance with the relative movement between the belt 17 and the slide member 41, as illustrated in a broken line in FIG. 10A, the holding plate 42g deforms (plastically deforms) in a rotation direction in which the holding plate 42g is displaced backward the vehicle around a base point B1 of deformation extending in the height direction of the vehicle along the rear vertical wall 42f at the position of the rear end thereof. In this case, as illustrated in FIG. 11A, the base point B1 of the deformation is positioned backward (backward in an input direction of a load) the vehicle from a holding point H1 at which the holding plate 42g holds the rear end 17a of the belt 17. Therefore, a distal end surface (front end surface facing the rear end 17a of the belt 17) 43a of the holding portion 43, at which the holding point H1 is positioned, protrudes further to the vehicle outside. In this case, even if the holding portion 43 is deformed, an overlapped amount (lap margin) with the belt 17 in the width direction of the vehicle does not decrease. Therefore, even if the holding portion 43 presses the rear end 17a of the belt 17 so that the belt 17 is displaced in the width direction of the vehicle, the holding state of the rear end 17a of the belt 17 is more reliably maintained.

Figure 10B:
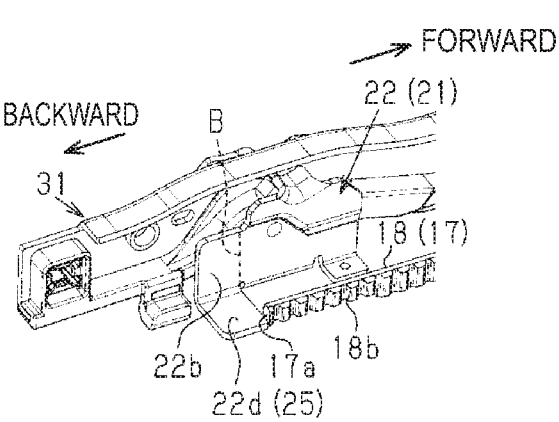
Figure 11B:
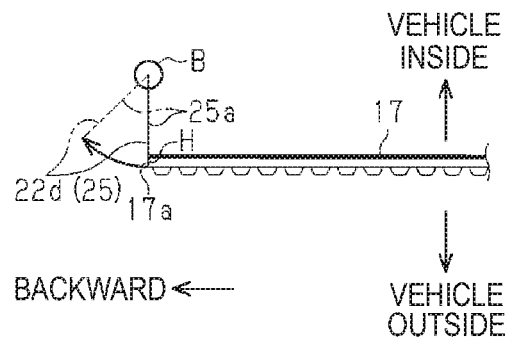

Moreover, as illustrated in FIGS. 10B and 11B, in the first embodiment, the position of the base point B of the deformation matches with a holding point H at which the holding plate 22d holds the rear end 17a of the belt 17 in the forward and backward direction. Therefore, if the holding plate 22d (holding portion 25) presses the rear end 17a of the belt 17 in accordance with the relative movement between the belt 17 and the slide member 21, a distal end surface (front end surface facing the rear end 17a of the belt 17) 25a of the holding portion 25 on which the holding point H is positioned is deformed so as to be pulled further in the vehicle inside. In this case, the overlapped amount (lap margin) with the belt 17 in the width direction of the vehicle decreases in accordance with the deformation of the holding portion 25, and there is a possibility that the slide member 21 moves forward the vehicle while scraping the belt 17 without compressing the belt 17.

Figure 12A:
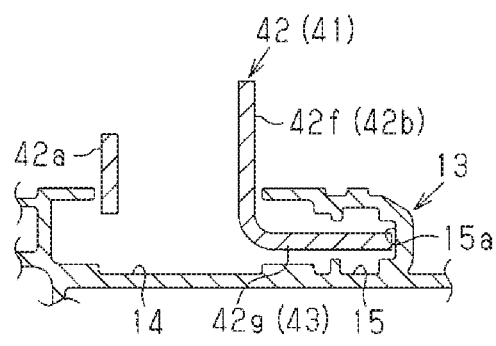
FIGS. 12A and 12B are sectional views illustrating the operation of the sunroof apparatus of the second embodiment.
Figure 12B:
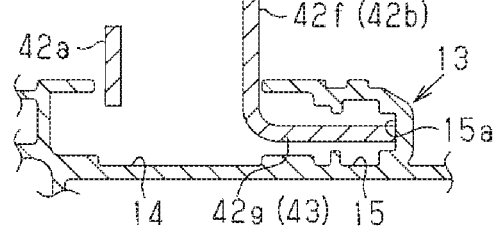

In addition, as illustrated by a change from FIG. 12A to FIG. 12B, if the holding plate 42g (holding portion 43) presses the rear end 17a of the belt 17 in accordance with the relative movement between the belt 17 and the slide member 41, the holding portion 43 is deformed so that the distal end surface 43a at which the holding point H1 is positioned closes to the inner wall surface 15a of the belt guide groove 15. Therefore, at the time of deformation of the holding portion 43, the distal end surface 43a abuts against the inner wall surface 15a of the belt guide groove 15 so that the deformation is suppressed.

As described above, according to the embodiment, the following effects can be obtained in addition to the effects of the first embodiment.

(1) In the embodiment, if the holding plate 42g (holding portion 43) presses the rear end 17a of the belt 17 in accordance with the relative movement between the belt 17 and the slide member 41, the holding portion 43 deforms so as to displace backward the vehicle based on the base point B1 of the deformation, that is, the distal end surface 43a of the holding portion 43, at which the holding point H1 is positioned, protrudes further in the width direction of the vehicle. Therefore, even if the holding portion 43 presses the rear end 17a of the belt 17 so that the belt 17 is displaced in the width direction of the vehicle, the holding state of the rear end 17a of the belt 17 can be further reliably maintained. The holding state by the protrusion of the distal end surface 43a of the holding portion 43 is more effectively maintained as the deformation of the holding portion 43 progresses.

In addition, in this case, the holding portion 43 is deformed so that the distal end surface 43a on which the holding point H1 is positioned closes to the inner wall surface 15a of the belt guide groove 15. Therefore, at the time of deformation of the holding portion 43, the distal end surface 43a abuts against and interferes with the inner wall surface 15a of the belt guide groove 15 so that the deformation can be further suppressed. Alternatively, at the time of deformation of the holding portion 43, it is possible to suppress that the slide member 41 moves forward the vehicle due to a frictional force generated between the holding portion 43 and the inner wall surface 15a of the belt guide groove 15 against which the distal end surface 43a abuts. Braking of the slide member 41 due to the frictional force becomes more effective as the deformation of the holding portion 43 progresses.

Moreover, the embodiment may be modified as follows.

In the first embodiment, the second vertical wall (22b) may not abut against the support member 31 in the deformation direction of the holding portion 25 in accordance with pressing of the distal end (rear end 17a) of the belt 17.

In the first embodiment, the holding plate 22d is connected to the lower end of the second vertical wall 22b, but for example, the holding plate 22d may be connected to the rear end portion of the bottom wall 22c extending backward the vehicle from the second vertical wall 22b.

In the second embodiment, the rear vertical wall (42f) may abut against the support member 31 in the deformation direction of the holding portion 43 in accordance with pressing of the distal end (rear end 17a) of the belt 17.

In each embodiment, the entirety of the holding portions (25 and 43) may be made of metal, or may be made of resin.

In each embodiment, the holding portions (25 and 43) may not be disposed so as to include the core material 19 in the range in the height direction of the vehicle.

In each embodiment, the core material 19 may not be embedded in the belt (17).

In each embodiment, the engagement structure for integrally moving the belt 17 and the slide members 21 and 41 may be, for example, a fitting hole as the driving-side engagement portion formed in the belt 17 and a fitting protrusion portion as the driven-side engagement portion protruding from the slide members 21 and 41, and being inserted into the fitting hole.

In each embodiment, instead of the belt 17, a push-pull cable or a geared cable may be adopted.

In each embodiment, a so-called outer sliding type, in which a sliding operation is performed in the tilt-up state in the opening and closing operation of the opening 10a by the movable panel 12, may be adopted.

Next, technical ideas which can be grasped from the above embodiments and other examples will be additionally described below.

(A) In the sunroof apparatus, a sunroof apparatus, in which at least a part of the holding portion is made of metal, is provided.

According to the configuration, at least a part of the holding portion is made of metal so that it is possible to reduce the size thereof while ensuring the required rigidity.

A sunroof apparatus according to an aspect of this disclosure includes: a movable panel which is adapted to open and close an opening formed in a roof of a vehicle; a guide rail which is provided at each of both-side edge portions of the opening in a width direction of the vehicle; a cable which has a driving-side engagement portion and is driven so as to move in a forward and backward direction of the vehicle, along the guide rail; a slide member which has a driven-side engagement portion engaging with the driving-side engagement portion, is linked to each of both-side edge portions of the movable panel in the width direction of the vehicle, and is provided so as to be movable in the forward and backward direction of the vehicle along the guide rail, so that movement of the slide member in the forward and backward direction of the vehicle causes the movable panel to open and close; and a holding portion which protrudes from the slide member in the width direction of the vehicle and is positioned backward of the cable in the vehicle to abut against or close to the cable.

In this configuration, when the movable panel, which is in an opened state, is jumped out forward the vehicle vigorously, due to a large input with respect to the vehicle, engagement between the driving-side engagement portion and the driven-side engagement portion is released, and thereby the cable and the slide member relatively move in the forward and backward direction of the vehicle. In this case, the holding portion positioned backward of the cable in the vehicle presses against a distal end of the cable so that the cable buckles and deforms while buffering an impact force. Therefore, the relative movement between the cable and the slide member can be quickly stopped.

It is preferable that the sunroof apparatus according to the aspect of this disclosure further includes a support member which supports each edge portion of the movable panel in the width direction of the vehicle, in which it is preferable that the slide member is linked to each edge portion of the movable panel in the width direction of the vehicle, via the support member, and includes a vertical wall which stands upright adjacent to the support member in the width direction of the vehicle, is connected to the holding portion, and is capable of abutting against the support member in a deformation direction of the holding portion according to pressing of the distal end of the cable.

In this configuration, when the holding portion is deformed together with the vertical wall as the holding portion presses the distal end of the cable by the relative movement between the cable and the slide member, the vertical wall abuts against the support member. Therefore, the deformation of the holding portion can be suppressed.

In the sunroof apparatus according to the aspect of this disclosure, it is preferable that a base point of the deformation of the holding portion according to pressing of the distal end of the cable is positioned at the back side of the vehicle from a holding point at which the distal end of the cable is held by the holding portion.

In this configuration, when the holding portion presses the distal end of the cable in accordance with the relative movement between the cable and the slide member, the holding portion is deformed so that the holding portion is displaced backward the vehicle with the base point of the deformation as a reference, that is, a distal end surface (distal end surface facing the distal end of the cable) of the holding portion, on which the holding point is positioned, further protrudes in the width direction of the vehicle. Therefore, even if the cable is displaced in the width direction of the vehicle as the holding portion presses the distal end of the cable, a holding state of the distal end of the cable can be reliably maintained.

In the sunroof apparatus according to the aspect of this disclosure, it is preferable that the cable is a belt in which a core material extending in an extending direction thereof is embedded, and the holding portion is set to be larger than the core material in a dimension in a height direction of the vehicle and is disposed so as to include the core material in a range in the height direction of the vehicle.

In this configuration, the holding portion includes the core material in the range in the height direction of the vehicle, so that when the distal end of the belt is pressed in accordance with the relative movement between the cable and the slide member, the entire distal end of the core material is pressed. Therefore, it is possible to suppress tearing of the belt pressed by the holding portion, in the height direction of the vehicle, so that buckling deformation of the belt can be further stabilized.

This disclosure has an advantage of quickly stopping the relative movement between the cable and the slide member when there is a large input to the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
   a movable panel which is adapted to open and close an opening formed in a roof of a vehicle;
   a guide rail which is provided at each of both-side edge portions of the opening in a width direction of the vehicle;
   a belt which has a driving-side engagement portion and is driven so as to move in a forward and backward direction of the vehicle, along the guide rail;
   a slide member which has a driven-side engagement portion engaging with the driving-side engagement portion, is linked to a side edge portion of the movable panel in the width direction of the vehicle, and is provided so as to be movable in the forward and backward direction of the vehicle, along the guide rail, so that movement of the slide member in the forward and backward direction of the vehicle causes the movable panel to open and close;
   a holding portion which protrudes from the slide member in the width direction of the vehicle and is positioned backward of the belt in the vehicle to abut against or close to the belt; and
   a support member which supports each the side edge portion of the movable panel in the width direction of the vehicle,
   wherein the slide member is linked to the side edge portion of the movable panel in the width direction of the vehicle, via the support member, and includes a vertical wall which stands upright adjacent to the support member in the width direction of the vehicle, is connected to the holding portion, and is capable of abutting against the support member in a deformation direction of the holding portion according to pressing of a distal end of the belt.

2. The sunroof apparatus according to claim 1, wherein a base point of deformation of the holding portion according to pressing of the distal end of the belt is positioned at the back side of the vehicle from a holding point at which the distal end of the belt is held by the holding portion.

3. The sunroof apparatus according to claim 1, wherein the belt embeds a core material extending in an extending direction, and
   the holding portion is set to be larger than the core material in a dimension in a height direction of the vehicle and is disposed so as to include the core material in a range in the height direction of the vehicle.

4. The sunroof apparatus according to claim 2, wherein the belt embeds a core material extending in an extending direction, and
   the holding portion is set to be larger than the core material in a dimension in a height direction of the vehicle and is disposed so as to include the core material in a range in the height direction of the vehicle.

* * * * *